United States Patent
Takai

(10) Patent No.: US 7,194,819 B2
(45) Date of Patent: Mar. 27, 2007

(54) OPPOSED TYPE FULCRUM MEMBER OF LEVER DETECTOR

(75) Inventor: Nozomi Takai, Tsuchiura (JP)

(73) Assignees: Tokyo Seimitsu Co., Ltd., Mitaka (JP); Tosei Engineering Corporation, Tsuchiura (JP)

(*) Notice: Subject to any disclaimer, the term of this patent is extended or adjusted under 35 U.S.C. 154(b) by 57 days.

(21) Appl. No.: 11/074,691

(22) Filed: Mar. 9, 2005

(65) Prior Publication Data
US 2005/0198848 A1    Sep. 15, 2005

(30) Foreign Application Priority Data
Mar. 10, 2004   (JP)   ............... 2004-067745

(51) Int. Cl.
G01B 7/12   (2006.01)
G01B 1/00   (2006.01)

(52) U.S. Cl. ............................ 33/542; 33/783
(58) Field of Classification Search ............... 33/783, 33/784, 788, 789, 542, 558, 561, 501.09, 33/501.6
See application file for complete search history.

(56) References Cited

U.S. PATENT DOCUMENTS

| | | | | |
|---|---|---|---|---|
| 2,989,428 A | * | 6/1961 | Wilson | 148/708 |
| 3,977,915 A | * | 8/1976 | Greenwood | 148/708 |
| 4,290,204 A | | 9/1981 | Possati | |
| 4,348,814 A | * | 9/1982 | Possati et al. | 33/501.09 |
| 4,385,444 A | | 5/1983 | Possati et al. | |
| 4,787,149 A | * | 11/1988 | Possati et al. | 33/542 |
| 4,805,309 A | * | 2/1989 | Koike | 33/501.02 |
| 4,884,346 A | | 12/1989 | Cook | |
| 5,083,384 A | * | 1/1992 | Possati et al. | 33/542 |

FOREIGN PATENT DOCUMENTS

| | | |
|---|---|---|
| EP | 0 312 761 A1 | 4/1989 |
| JP | 57-023806 | 2/1982 |
| JP | 11-311269 | 11/1999 |

* cited by examiner

Primary Examiner—R. Alexander Smith
(74) Attorney, Agent, or Firm—David S. Safran

(57) ABSTRACT

An opposed type fulcrum member of a lever detector is constituted by a main body part having a U-shaped section and thin-walled parts each formed in opposed positions of two sides of the main body part, and two ends of the U-shaped main body part can rock, with the tin-walled parts serving as fulcrums. By performing the U-shaped working and thin-walled working of the main body part by press forming, a low-cost, uniform opposed type fulcrum member is obtained and it is possible to reduce the cost of the whole lever detector.

4 Claims, 6 Drawing Sheets

FIG.4A
FIG.4B
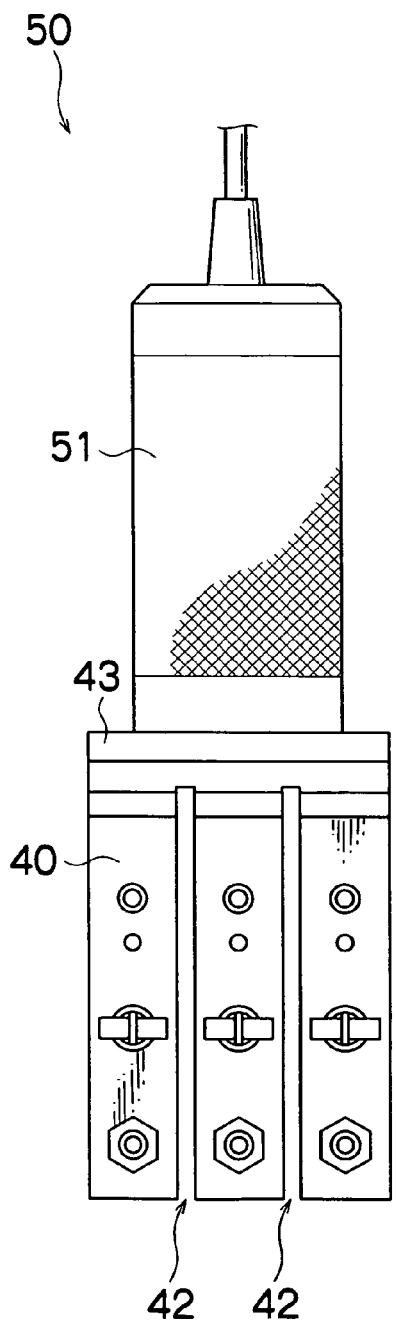
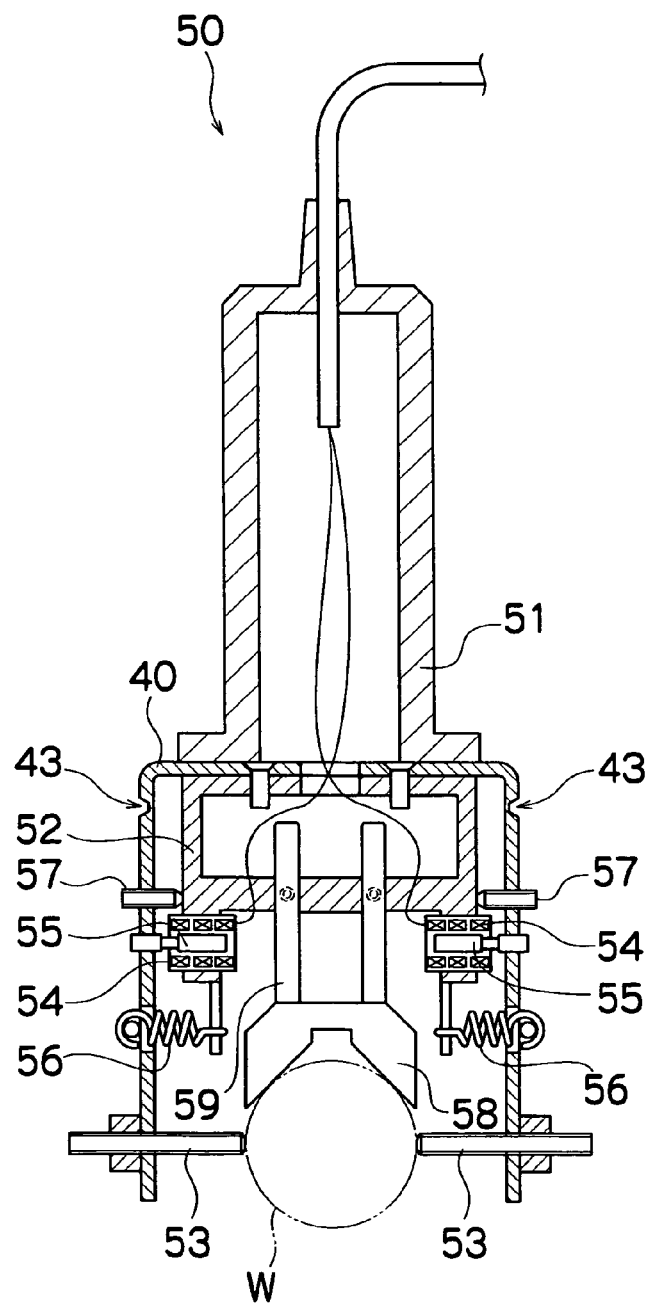

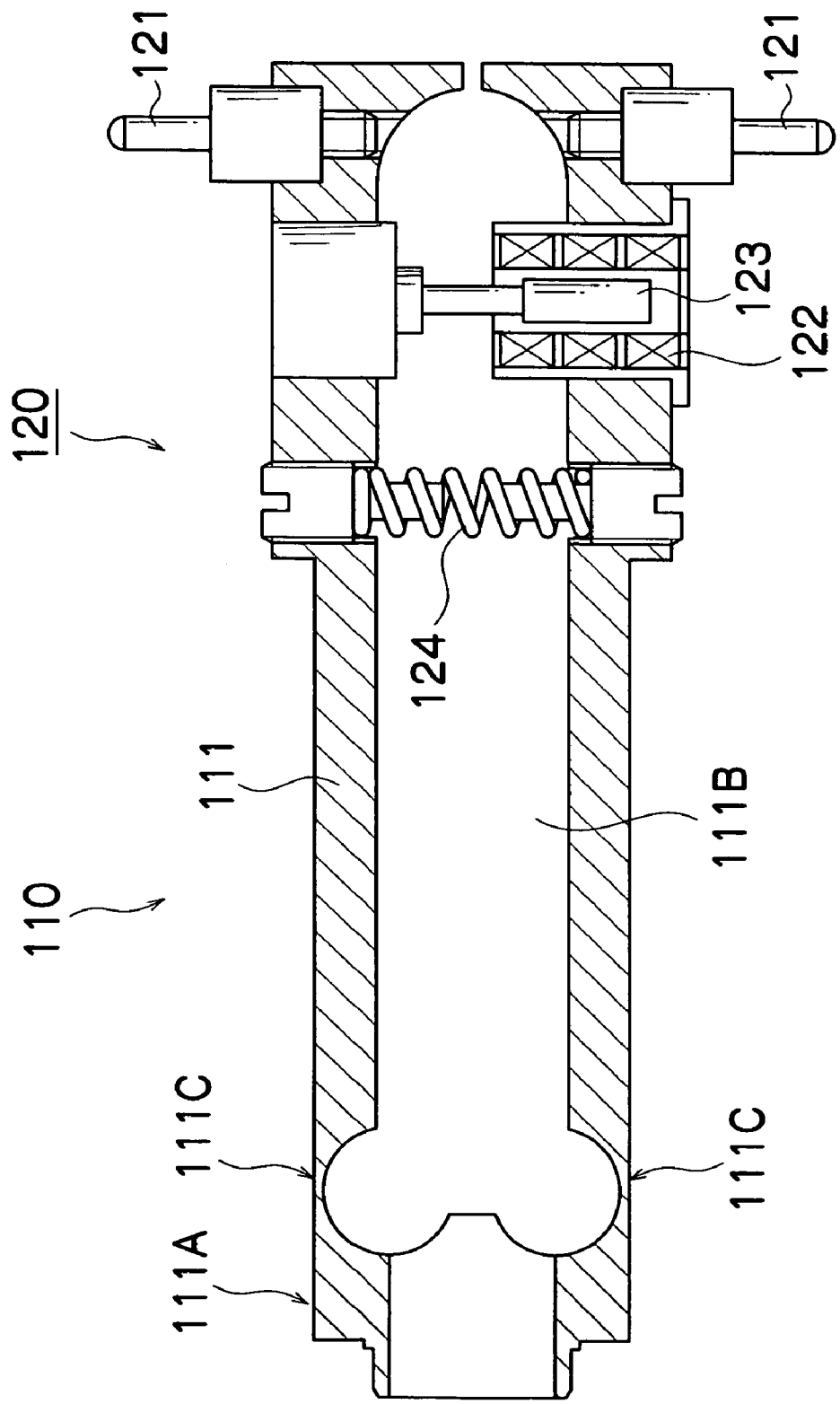
FIG.5 RELATED ARTS

RELATED ARTS
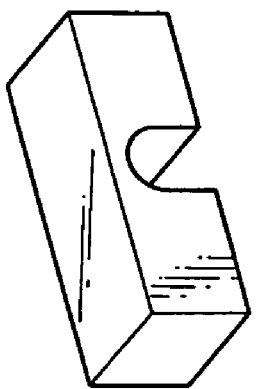
ELASTIC FULCRUM
FIG.6C
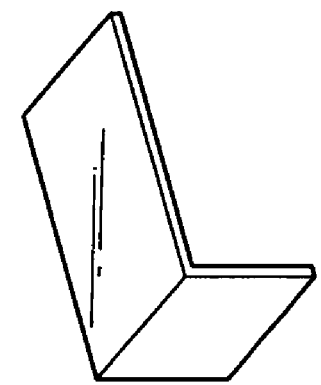
L-SHAPED SPRING FULCRUM
FIG.6B
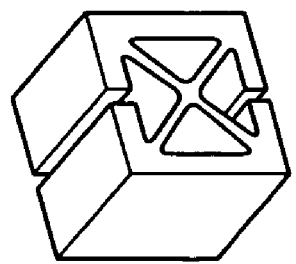
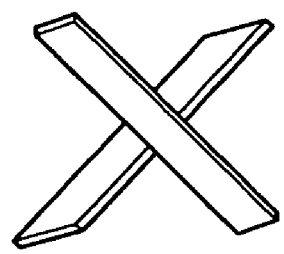
CROSS-SHAPED SPRING FULCRUM
FIG.6A

OPPOSED TYPE FULCRUM MEMBER OF LEVER DETECTOR

BACKGROUND OF THE INVENTION

1. Field of the Invention

The present invention relates to a fulcrum member and, particularly, to an opposed type fulcrum member used in a lever detector and the like.

2. Description of the Related Art

In a pinching type lever detector that measures the inside diameter and outside diameter of a work, two finger arms to each of the leading ends of which contact pieces are attached are supported in such a manner as to permit seesaw motions around an opposed type fulcrum member and the amount of movement of each of the finger arms when the two contact pieces are caused to abut against the work is detected by the detector.

As a fulcrum member, a cross-shaped spring fulcrum as shown in FIG. 6A, an L-shaped spring fulcrum as shown in FIG. 6B, an elastic fulcrum as shown in FIG. 6C, a bearing not illustrated, etc. are used. A cross-shaped spring fulcrum is generally constructed by disposing two plate springs as shown in the left side part of FIG. 6A in a cross manner. In this type, however, assembling requires time and variations occur in the spring characteristics due to assembling errors. There is also a type in which as shown in the right side part of FIG. 6A, a cross-shaped spring is integrally formed by being cut from a wire. This type, however, had the problems that the manufacturing cost is high and that durability decreases due to microcracks in worked surfaces.

An L-shaped fulcrum is inexpensive and this is a fulcrum that has generally found wide use. However, this type has the disadvantage that the center of the fulcrum moves as a result of circling motions, and is not suitable for a high-accuracy fulcrum member. Although there is no limit to circulating angles, a bearing fulcrum requires periodical replacements because accuracy decreases due to wear.

An elastic fulcrum is suitable for a narrow measuring range because of high accuracy although circulating angles are small because of the utilization of elastic deformation.

An elastic fulcrum member 110 as shown in FIG. 5 is used in a pinching type lever detector that measures the inside diameter of a work. In this elastic fulcrum, as shown in FIG. 5, a cylindrical main body 111 is formed as a hollow body and a large opening 111B is formed on both sides except for a cylindrical base part 111A, whereby the whole main body 111 is formed to be roughly U-shape and a thin-walled part 111C is formed in two places near the cylindrical base part 111A, the thin-walled parts each serving as an elastic fulcrum.

In the pinching type lever detector 120, a coil spring 124 provided in the main body 111 urges the U-shaped main body in outward directions and the amount of displacement of contact pieces 121 attached to the leading ends of the main body is detected as the displacement of a coil 122 and a core 123 of a differential transformer. An inside diameter measuring device similar to this pinching type lever detector 120 is described in the Japanese Patent Application Laid-open No. 57-23806, for example.

There has been proposed a friction addition device that is based on the utilization of this elastic deformation and uses a lever member in which a thin-walled part is provided as a fulcrum (refer to the Japanese Patent Application Laid-open No. 11-311269, for example).

SUMMARY OF THE INVENTION

However, in both the elastic fulcrum shown in FIG. 5 and the Japanese Patent Application Laid-open No. 57-23806 above and the lever member described in the Japanese Patent Application Laid-open No. 11-311269, the part of the fulcrum that undergoes elastic deformation is fabricated by being machined from the material by cutting or grinding. Therefore, the working cost was high and this resulted in a rise in the cost of the whole lever detector. Particularly, in a lever detector for multiple-gang measurement, in which the shape of an elastic fulcrum is more complex, the working cost of a fulcrum member posed a big problem.

The present invention has been made in view of such circumstances and has as its object the provision of a low-cost, high-accuracy opposed type fulcrum member of a lever detector.

To achieve the above-described object, the opposed type fulcrum member of a lever detector related to the invention is an opposed type fulcrum member of a lever detector, which comprises a main body part having a U-shaped section and thin-walled parts each formed in opposed positions of two sides of the main body part, and in which two leading ends of the U-shaped main body part are formed so as to be able to rock, with the thin-walled parts serving as fulcrums, and U-shaped working and thin-walled working of the main body part are performed by press forming.

According to the invention, because the U-shaped working and thin-walled working of the main body part are performed by press forming, a low-cost, uniform opposed type fulcrum member can be obtained and it is possible to achieve a cost reduction of the whole lever detector.

Furthermore, the present invention requires as an additional requirement that the opposed type fulcrum member be formed as one piece of multiple gangs. According to this additional requirement, also an opposed type fulcrum member of complex shape to be incorporated in a lever detector for multiple-gang measurement is fabricated as one piece and, therefore, the working cost is very low.

Also, the present invention requires as an additional requirement that heat treatment be performed after the press forming. As a result of this, the spring characteristics of the fulcrum part are improved.

As described above, according to the opposed type fulcrum member of a lever detector of the invention, in an opposed type fulcrum member that comprises a main body part having a U-shaped section and thin-walled parts each formed in opposed positions of two side surfaces of the main body part, the U-shaped working and thin-walled working of the main body part are performed by press forming. Therefore, a low-cost, uniform opposed type fulcrum member is obtained and it is possible to reduce the cost of the whole lever detector.

BRIEF DESCRIPTION OF THE DRAWINGS

FIGS. 4A and 4B are a front view and a sectional side view, respectively, of a hand gauge for three-gang outside diameter measurement;

FIG. 5 is a sectional view of a lever detector in which a conventional elastic fulcrum member is used; and FIGS. 6A to 6C are each a perspective view of various kinds of fulcrum members.

DETAILED DESCRIPTION OF THE PREFERRED EMBODIMENTS

Figure 1:
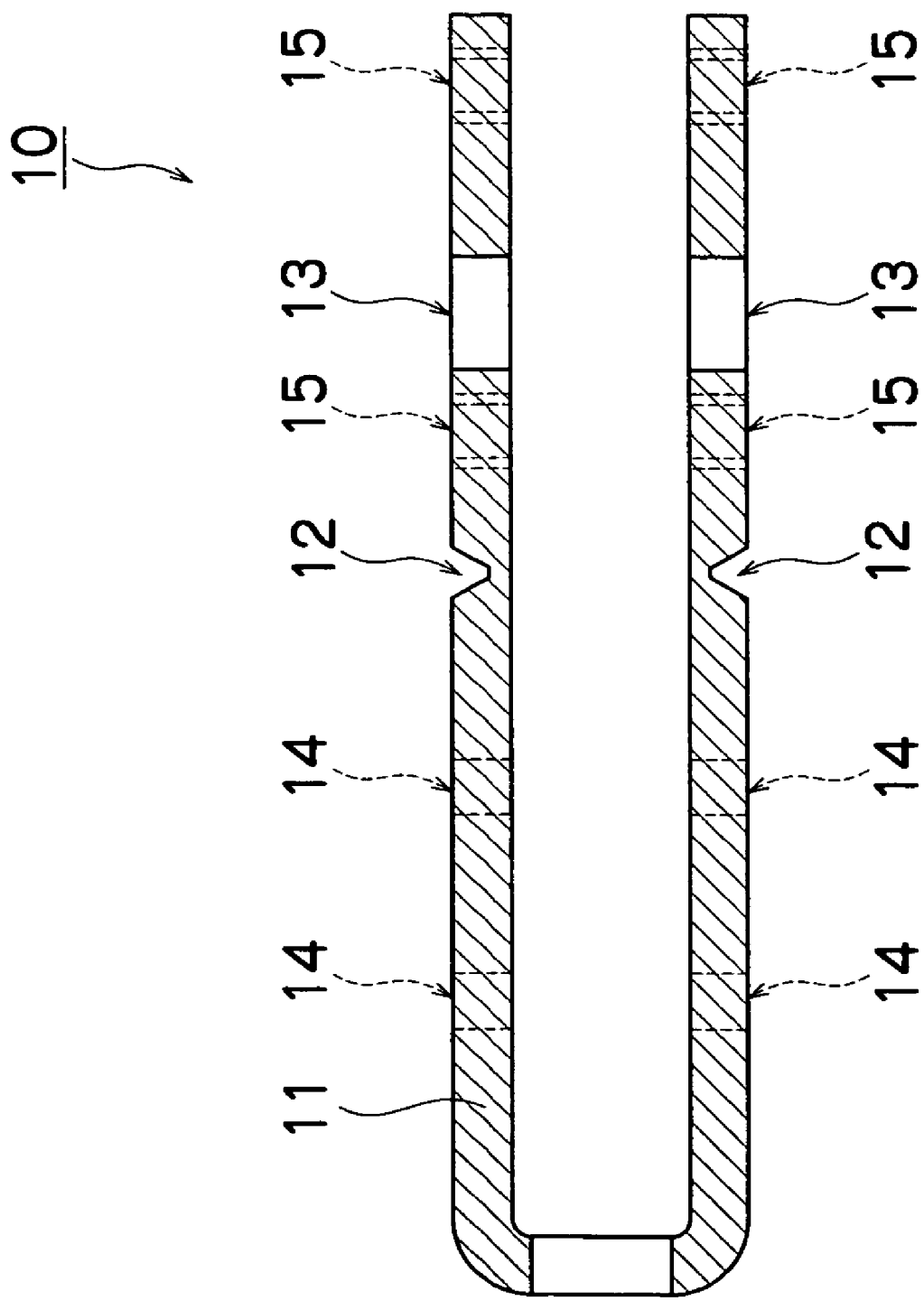
FIG. 1 is a sectional view of an opposed type fulcrum member of a lever detector in an embodiment of the invention.

Preferred embodiments of the opposed type fulcrum member of a lever detector related to the present invention will be described below with reference to the drawings. Incidentally, in the drawings, like reference numerals or like reference characters refer to like members.

FIG. 1 is a sectional view of an opposed type fulcrum member of a lever detector in an embodiment of the invention. As shown in FIG. 1, an opposed type fulcrum member 10 has a main body part 11 that is bent to be U-shape in section, and thin-walled parts 12 are formed in opposed positions of two sides of the main body part 11.

The leading ends of the two sides of the main body part 11 are able to rock, with these thin-walled parts 12 serving as elastic fulcrums. Tapped holes 15, holes 13 and holes 14 are formed in opposed positions on two sides of this main body part 11.

In the opposed type fulcrum member 10, the U-shaped working and thin-walled working of the main body part 11 are performed by press forming and heat treatment is performed after that, with the result that the spring characteristics of the thin-walled parts 12 are improved. The U-shaped working and thin-walled working of the main body part 11 may be simultaneously performed by press forming or the thin-walled working and U-shaped working may be separately performed by press forming.

By fabricating the opposed type fulcrum member 10 by press forming in this manner, a substantial cost reduction can be achieved compared to the fabrication by cutting or grinding. Also, the structure of the thin-walled parts 12 that provide elastic fulcrums becomes dense due to press forming and there is no streak that might occur by cutting and grinding, with the result that the material strength is improved and an improvement in repeated proof stress is obtained.

Figure 2:
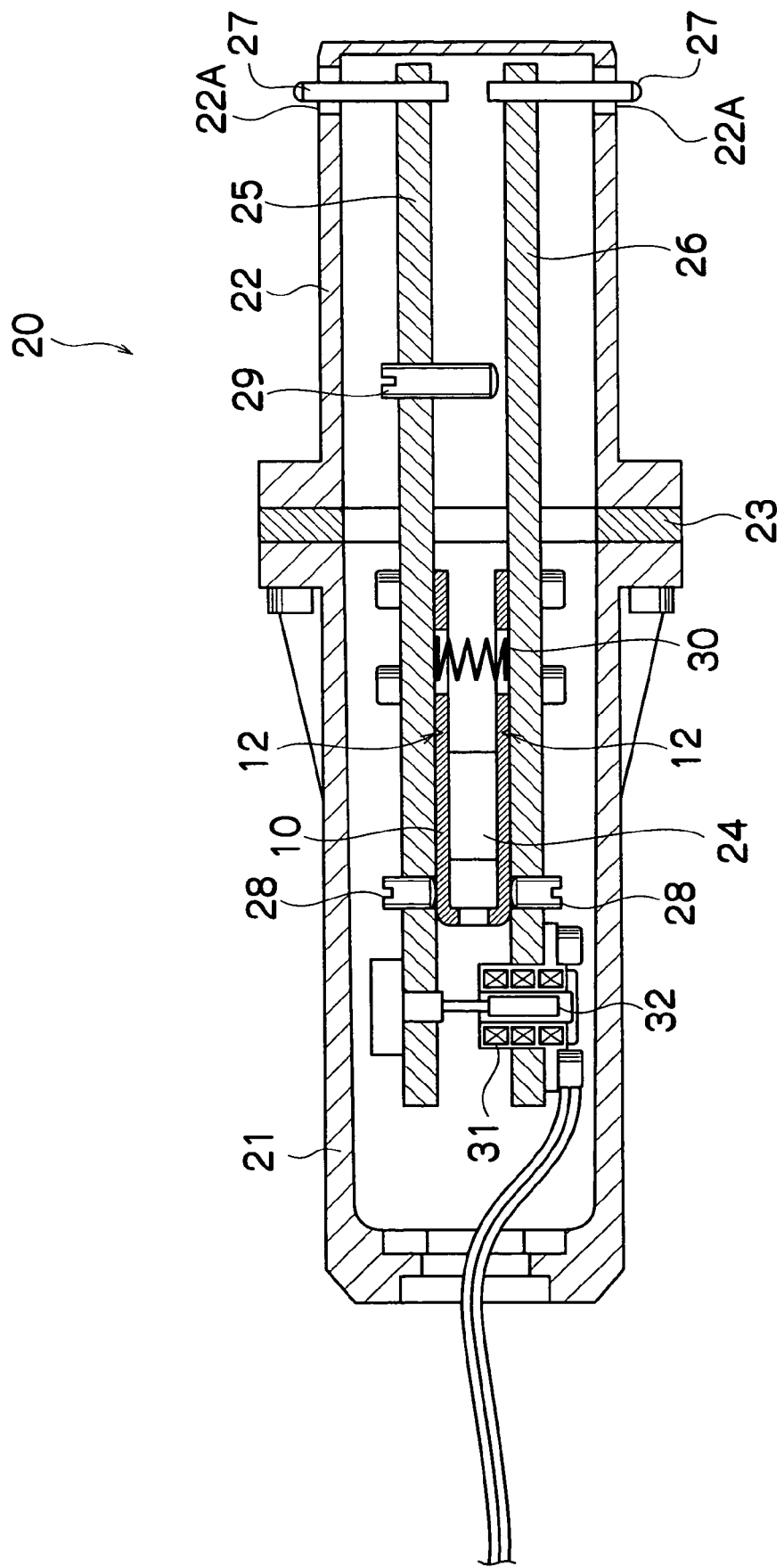
FIG. 2 is a sectional view of a hand gauge for inside diameter measurement in which an opposed type fulcrum member of the invention is used.

FIG. 2 is a sectional view of a hand gauge for inside diameter measurement as a lever detector in which the opposed type fulcrum member 10 of the invention is used. As shown in FIG. 2, a hand gauge for inside diameter measurement (a lever detector) 20 is sheathed with a main-body grip part 21 and a guide part 22 attached to the main-body grip part 21 via a spacer 23, and a measuring mechanism is incorporated in the interior of the main-body grip part 21 and the guide part 22.

An opposed type fulcrum member 10 is screwed to a mounting block 24 fixed to the main-body grip part 21 by use of the holes 14. A finger 25 is screwed to the top surface of the opposed type fulcrum member 10 by use of the tapped holes 15, and a finger 26 is screwed to the bottom surface of the opposed type fulcrum member 10 by use of the tapped holes 15.

As a result of this, the finger 25 and the finger 26 are each able to rock, with the thin-walled parts 12 of the opposed type fulcrum member 10 serving as fulcrums.

A contact piece 27 is fixed to each of the leading ends of the finger 25 and the finger 26 and protrudes outward from holes 22A formed at the leading ends of the guide part 22. A core 32 of a differential transformer is fixed to the opposite side of the finger 25, and a coil 31 of the differential transformer is attached to the opposite side of the finger 26.

A compression coil spring 30 is provided between the holes 13 of the opposed type fulcrum member 10, and this compression coil spring 30 applies a measurement pressure to the contact pieces 27 by depressing the middle parts of the finger 25 and the finger 26. The measurement pressure is adjusted to 1.0 N or so at a measuring point of the contact piece 27.

A stopper 28 is attached to the differential transformer side of each of the finger 25 and the finger 26, and the position in which the stopper 28 abuts against the opposed type fulcrum member 10 becomes a limit position on the opening side of the contact piece 27. Also, the position in which the stopper 29 attached to the finger 25 abuts against the finger 26 becomes a limit position on the closing side of the contact piece 27.

The hand gauge for inside diameter measurement 20 is constructed in this manner and detects the amount of displacement of the contact pieces 27 that use the thin-walled parts 12 of the opposed type fulcrum member 10 as fulcrums by use of the differential transformer.

In measuring the inside diameter of a hole, the operator can measure the inside diameter of the hole to be measured with good accuracy only by holding the hand gauge for inside diameter measurement 20 by the main-body grip 21 of the hand gauge for inside diameter measurement 20 and inserting the guide part 22 into the hole to be measured.

Figure 3:
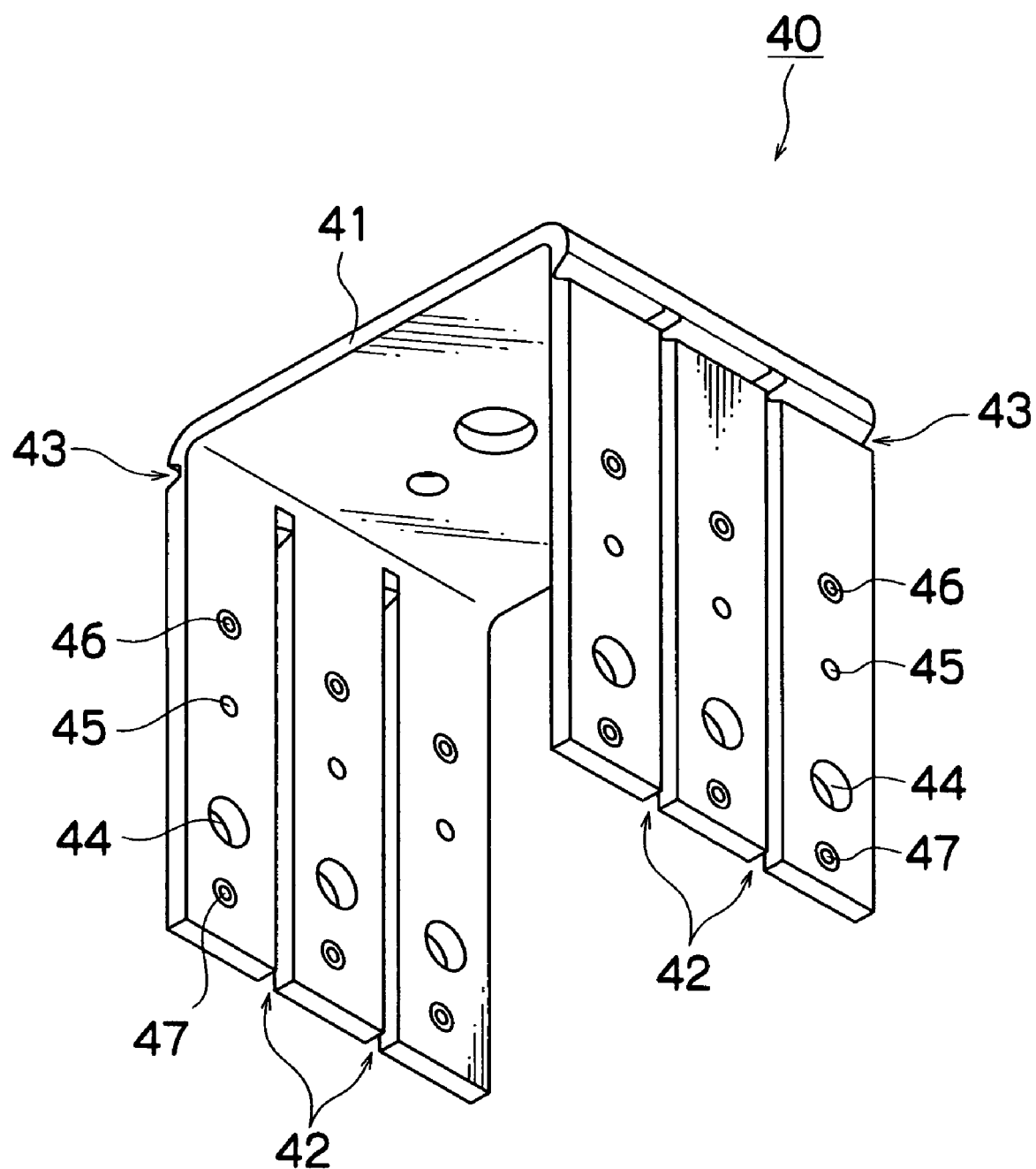
FIG. 3 is a perspective view of an example of modification to the embodiment of the invention.

FIG. 3 is a perspective view of an example of modification to the embodiment related to the opposed type fulcrum member of a lever detector of the invention. This example of modification is a three-gang opposed type fulcrum member in which three gangs of opposed type fulcrums are used. In a three-gang opposed type fulcrum member (an opposed type fulcrum member) 40, as shown in FIG. 3, a main body part 41 is bent to be U-shaped in section.

A thin-walled part 43 is formed each in the base parts of two sides of the main body part 41. Cuts 42 are made in the parts of the two sides of the main body part 41 that are on the leading end side compared to the thin-walled parts 43, whereby the side parts are each laterally divided into three equal portions. The side parts thus divided into three equal portions can swing independently, with the thin-walled parts 43 serving as elastic fulcrums.

Holes 44, 45 and tapped holes 46, 47 are made in each of the side surface portions of the two sides divided into three equal portions. In this three-gang opposed type fulcrum member 40, the U-shaped working and thin-walled working of the main body 41 is performed by press forming. Also, heat treatment is performed after the forming, whereby the spring characteristics of the tin-walled parts 43 are improved.

Incidentally, the U-shaped working and thin-walled working of the main body 41 may be simultaneously performed or may be separately performed.

FIGS. 4A and 4B show a hand gauge for three-gang outside diameter measurement as a lever detector in which this three-gang opposed type fulcrum member 40 is used. FIGS. 4A and 4B are a front view and a sectional side view, respectively, of this hand gauge.

In a hand gauge for three-gang outside diameter measurement (a lever detector) 50, as shown in FIGS. 4A and 4B, the three-gang opposed type fulcrum member 40 is screwed to a center member 52 and screwed and fixed to a main-body grip 51.

One contact piece 53, one core 55 of the differential transformer and one stopper 57 are attached to each of the two sides of the three gangs of the three-gang opposed type fulcrum member 40, that is, a total of six items are attached.

Also, a total of six coils 54 of the differential transformer are provided in positions corresponding to the cores 55 of the differential transformers attached to each of the two sides of the three gangs of the three-gang opposed type fulcrum member 40.

Furthermore, between each of the two sides of the three gangs of the three-gang opposed type fulcrum member 40 and the center member 52, there is provided an extension coil spring 56 that applies a measurement pressure to the contact piece 53. The measurement pressure is adjusted to 1.0 N or so in the measuring point of the contact piece 53.

Owing to this mechanism, in the hand gauge for three-gang outside diameter measurement 50, each of the three gangs of contact pieces 53 is independently urged in the closing direction in which the intervals from each other come closer, with the thin-walled parts 43 of the three-gang opposed type fulcrum member 40 serving as swing fulcrums, and the position in which the stopper 57 abuts against the center part 52 becomes a limit position on the closing side. Also, the amount of displacement of each of the contact pieces 53 is detected with high accuracy by the differential transformer.

In the center part of the U shape of the three-gang opposed type fulcrum member 40, a V-shaped base 58 is fixed to the center member 52 by use of clamp screws via two guide bars 59. The V-shaped base 58 can slide with respect to the center member 52 by use of the guide bars 59 by loosening the clamp screws so as to permit position adjustments.

In measuring the outside diameter of a shaft, the operator can measure the outside diameter of the shaft W to be measured simultaneously in three places with good accuracy only by holding the hand gauge for three-gang outside diameter measurement 50 by the main-body grip 51 of the hand gauge for three-gang outside diameter measurement 50 and pushing the hand gauge for three-gang outside diameter measurement 50 until the shaft W to be measured abuts against the V-shaped base 58.

Incidentally, in the above-described example of modification to the embodiment, the description was given of the three-gang opposed type fulcrum member 40 in which three gangs of opposed type fulcrums are used. However, the present invention is not limited to this, and the invention covers also a pair of opposed type fulcrum members and a multiple-gang opposed type fulcrum member having a plurality of opposed type fulcrums.

Also, a differential transformer containing coils and cores was used in the detection section of a lever detector in which the opposed type fulcrum member of the present invention. However, the application of the opposed type fulcrum member of the lever detector of the invention is not limited to only a detection section formed from a differential transformer, and the opposed type fulcrum member of the lever detector of the invention can be applied to a detection section in which various kinds of well-known sensors are used.

What is claimed is:

1. An opposed type fulcrum member of a lever detector, comprising:
    a main body part having a U-shaped section having a pair of legs connected by a cross member; and
    thin-walled parts each formed in opposed positions of two sides of the main body part by notches in each of said legs,
    wherein two leading ends of the U-shaped main body part are formed so as to be able to rock, with the thin-walled parts serving as fulcrums; and
    wherein the legs and notches are streak-free and have a density that has been increased by having been formed from a single piece by press forming of the single piece into said U-shaped section and by press forming of said notches into said legs.

2. The opposed type fulcrum member of a lever detector according to claim 1, wherein the opposed type fulcrum member is formed as one piece of multiple gangs.

3. The opposed type fulcrum member of a lever detector according to claim 2, wherein heat treatment is performed after the press forming.

4. The opposed type fulcrum member of a lever detector according to claim 1, wherein heat treatment is performed after the press forming.

* * * * *